United States Patent [19]

Yamazaki et al.

[11] 3,875,567

[45] Apr. 1, 1975

[54] MEMORY CIRCUIT USING VARIABLE THRESHOLD LEVEL FIELD-EFFECT DEVICE

[75] Inventors: Hiroshi Yamazaki, Isehara; Tadanori Yamaguchi, Atsugi, both of Japan

[73] Assignee: Sony Corporation, Tokyo, Japan

[22] Filed: Dec. 29, 1972

[21] Appl. No.: 319,774

[30] Foreign Application Priority Data

Dec. 29, 1971 Japan .......................... 47-133572

[52] U.S. Cl. ............ 340/173 R, 307/238, 307/304, 317/235 B, 317/235 AG

[51] Int. Cl. ......................... G11c 11/40, G11c 7/00

[58] Field of Search ............340/173 R; 317/235 B, 317/235 AG; 307/238, 304, 279, 251

[56] References Cited

UNITED STATES PATENTS

| | | | |
|---|---|---|---|
| 3,508,211 | 4/1970 | Wegener | 340/173 |
| 3,663,871 | 5/1972 | Nakanuma et al. | 340/173 |
| 3,728,695 | 4/1973 | Bentchkewsky | 340/173 R |
| 3,744,036 | 7/1973 | Bentchkowsky | 340/173 R |

*Primary Examiner*—Stuart N. Hecker
*Attorney, Agent, or Firm*—Lewis H. Eslinger; Alvin Sinderbrand

[57] ABSTRACT

A memory circuit using a variable threshold level field-effect device, such as a metal-silicon nitride-silicon dioxide-semiconductor field-effect transistor (MNOS FET) or a metal-aluminum oxide-silicon dioxide-semiconductor (MAOS) FET, as the memory transistor connected in series with at least one metal-insulator-silicon (MIS) FET. An addressing signal is supplied to the MIS FET to address the particular memory transistor connected thereto. In this condition, a signal for reading or writing information by changing the characteristics of the memory transistor can be applied to the gate of the latter transistor.

8 Claims, 21 Drawing Figures

MEMORY CIRCUIT USING VARIABLE THRESHOLD LEVEL FIELD-EFFECT DEVICE

BACKGROUND OF THE INVENTION

1. Field of the Invention

This invention relates to the field of semiconductor memory circuits and particularly to semiconductor memory circuits using variable threshold level field-effect devices.

2. The Prior Art

A variable threshold level field-effect memory device has been proposed to store information in terms of the threshold level, which can be set at either a first or a second value and which exhibits a hysteresis characteristic. Such memory-type field-effect transistors have an insulated gate with a multilayer construction. The voltage applied between the gate and the source electrode of this memory transistor can selectively set the threshold value in one of two states. Sampling voltages may be applied to the gate electrode to sense the state in which the transistor has been set. This provides non-destructive readout of information stored in the transistor. In addition, the transistors are suitable for construction as part of an integrated circuit (IC) device.

Heretofore, two high voltages for addressing a signal to a specific memory transistor in a circuit, each of such voltages having a different polarity, are required as the output of a decoder by which the memory transistor can be addressed. This means that the decoder must be relatively complex and, therefore, expensive in order to provide a breakddown voltage of the active element at a value higher than the voltage required for a normal FET. This makes it very difficult to construct an on-chip decoder in which at least the decoder and the memory transistor are fabricated on a common single chip, or substrate.

Accordingly, it is one of the objects of the present invention to overcome the aforementioned effects.

Another object is to provide a new and improved memory circuit utilizing a variable threshold field-effect device, or transistor.

A still further object is to provide an integrated memory array, and in particular a memory array constructed on an IC chip utilizing a wafer that is common to the decoder.

Further objects of the invention will be apparent from the following specification together with the drawings.

DETAILED DESCRIPTION OF THE INVENTION

Figure 1:
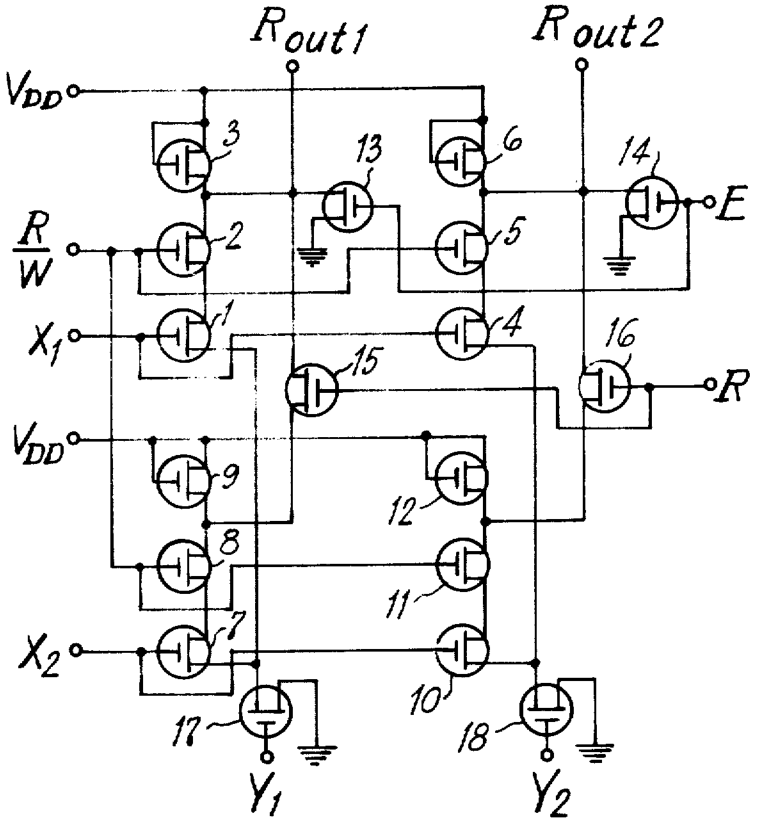
FIG. 1 is a circuit diagram for a four-bit memory array constructed according to the invention.
Figures 2A, 2B, 2C, 2D, 2E, 2F:
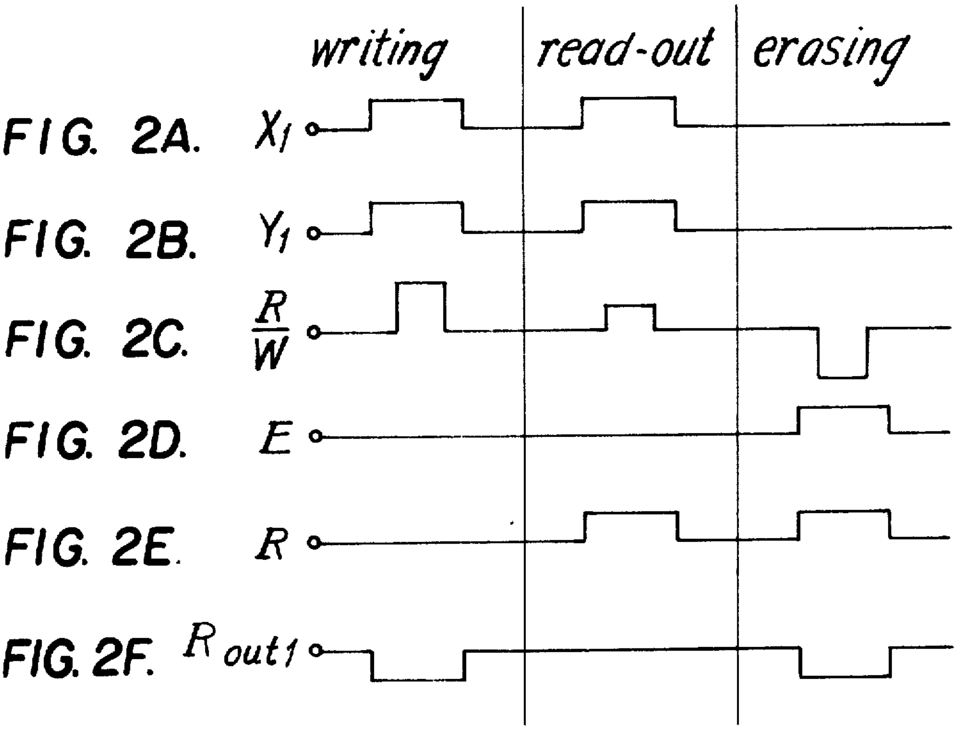
FIGS. 2A–2F illustrate voltage levels present in the circuit in FIG. 1 during writing, readout, and erasing.

In FIG. 1 there is a four-bit memory array, one section of which includes a MIS FET 1, a MAOS-type memory transistor 2, and a MIS FET 3. A second one-bit cell includes a MIS FET 4, a MAOS-type memory transistor 5, and a MIS FET 6. A third one-bit cell includes MIS FET's 7 and 9 and a MAOS FET 8. The fourth one-bit cell shown in FIG. 1 includes MIS FET's 10 and 12 and a MAOS FET 11.

In order to simplify the description of the operation of the circuit, reference will be made to FIG. 3 which shows only a portion of the circuit in FIG. 1 including a one-bit cell. However, the construction of the memory transistor 2 is disclosed in greater detail.

The memory transistor 2 includes a P-type semiconductor substrate 21 on one surface of which are two $N^+$semiconductor regions 22 and 23. These regions are, respectively, the source and drain of the transistor. A silicon dioxide layer 24 is applied to the surface of the transistor 2 overlapping the regions 22 and 23. An aluminum oxide ($Al_2O_3$) 25 covers the surface of the silicon dioxide layer 24 and is, in turn, covered by an electrode 26. This multilayer structure forms the gate region of the transistor 2. Beyond the source and drain regions 22 and 23 are relatively thick layers 27 of silicon dioxide, for example, and these layers are removed as necessary to allow a source electrode 28 to make contact with the source region 22 and a drain electrode 29 to make contact with the drain region 23.

Figure 3:
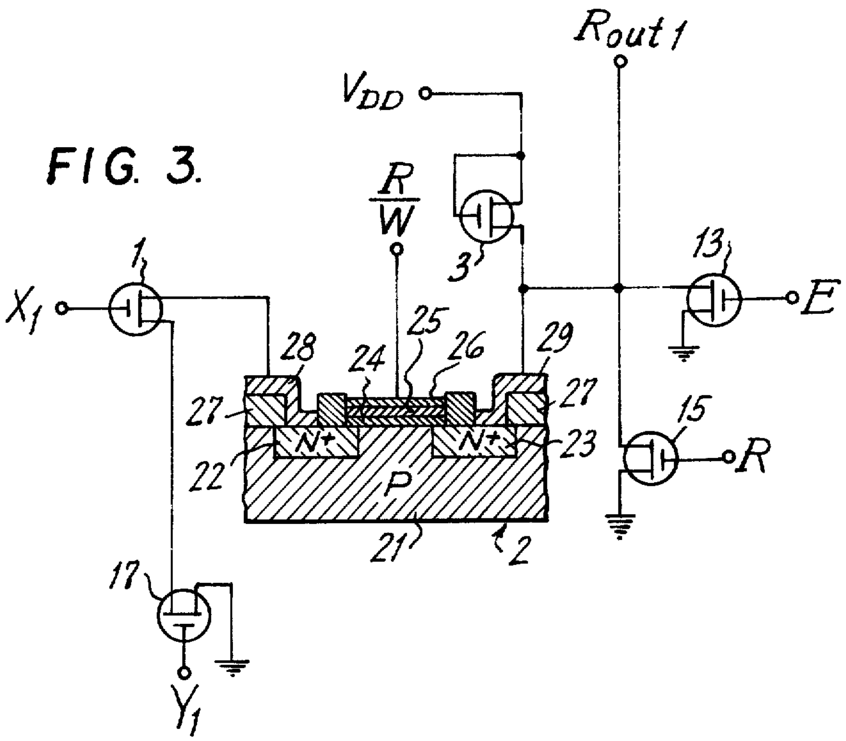
FIG. 3 shows a portion of the circuit in FIG. 1 with a cross sectional view of a semiconductor device used as the memory transistor in that circuit.

In the circuit in FIG. 3, a terminal R/W is provided for writing and reading out information and is connected to the gate electrode 26. The MIS FET 1 and another MIS FET 17 have their source-drain terminals connected in series between the source electrode 28 of the transistor 2 and ground. A terminal for addressing the $X_1$ row, of which the cell shown in FIG. 3 is a part, is connected to the gate of the FET 1, and a terminal for addressing the line $Y_1$, of which the cell shown in FIG. 3 is also a part, is connected to the gate of the FET 17. The source electrode of the FET 17 is connected to ground, and the drain electrode of that FET is connected to the source of the FET 1.

A terminal for an electric power source $V_{DD}$ is connected to the drain electrode 29 through the source-drain electrodes of the FET 3, which thereby serves as a load for the FET 2. A terminal $R_{out1}$ for reading information out of the cell shown in FIG. 3 is connected to the drain electrode 29, and a MIS FET 13, having a terminal E connected to its gate, has its source and drain terminals connected between the drain terminal 29 and ground in order to control or make a set of zero level. A MIS FET 15 is connected to the terminal $R_{out1}$ and has a gate connected to a terminal R so that information stored in the memory transistor 2 can be read out selectively.

The remaining three one-bit cells of the complete circuit in FIG. 1 operate in the same manner as the single one-bit cell shown in FIG. 3. Therefore, the explanation for the additional cells will be omitted.

In the complete circuit in FIG. 1, the gates of all of the memory transistors 2,5,8, and 11 are directly connected to the terminal R/W for reading and writing.

The gates of both of the MIS FET's 1 and 4 are connected to the terminal $X_1$ for receiving information to address row $X_1$. In the same manner, the gates of the MIS FET's 7 and 10 are connected to the terminal $X_2$ to receive information addressed to the $X_2$ row. The sources of the FET's 1 and 7 are both connected to the drain of the FET 17 for forming an addressing line $Y_1$. In the same manner, the sources of the FET's 4 and 10 are connected to the drain of the FET 18 to form an addressing line $Y_2$. The drain electrodes of the memory transistors 2 and 8 are connected together through the MIS FET 15 and are also connected to the terminal $R_{out1}$ for readout. The drain electrodes of the memory transistors 5 and 11 are connected together through the MIS FET 16 and are also connected to the terminal $R_{out2}$ for readout. Each of the gate electrodes of the MIS FET's 13 and 14 are connected directly to the terminal E and the gate electrodes of the MIS FET's 15 and 16 are connected to the terminal R.

The operation of the memory array described above is as follows: In order to write information into the memory transistor 2 in the form of a logical 1 a voltage plus $V_w$ is applied to the terminal R/W. In that case an addressing signal of a positive voltage should be applied to the terminals $X_1$ and $Y_1$, respectively. No voltage is applied to the terminal R and therefore both of the FET's 15 and 16 remain nonconductive. This prevents the channel potentials of the memory transistors from discharging.

Figure 4:
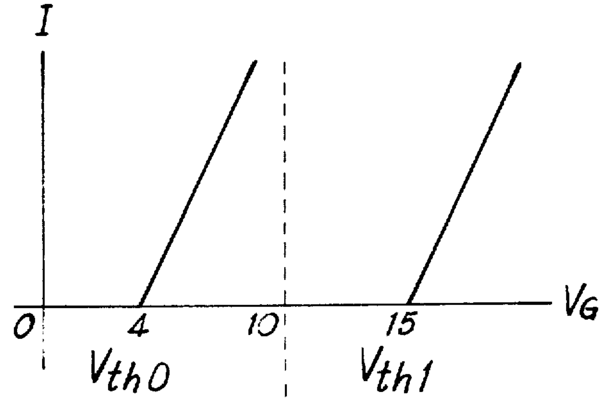
FIG. 4 shows gate voltage versus current characteristics for the two threshold values of the memory transistor shown in FIGS. 1 and 3.

FIGS. 2A–2F show, in the left-hand column, voltages applied to the terminals of the circuit in FIG. 1 to write information into the memory transistor 2. Application of positive voltages to the terminals $X_1$ and $Y_1$ causes the FET's 1 and 17 to be conductive. The channel or substrate potential of the memory transistor 2 addressed through the terminals $X_1$ and $Y_1$ will be a reference potential or a zero level. The term "zero level " does not mean ground potential or zero voltage. With the potentials applied to the terminals $X_1$ and $Y_1$ as stated a writing pulse plus $V_W$ having a voltage of approximately plus 40 volts may be applied to the gate of the memory transistor 2. As shown in FIG. 4, this will cause the threshold voltage of the memory transistor 2 to be shifted to $V_{th1}$ equal 15 volts, which is identified as the high state. Since the drains of each of the other memory transistors 5, 8 and 11 are connected to the terminal $V_{DD}$ of the power source, the threshold of the latter memory transistors does not shift to the high threshold $V_{th1}$ in response to the voltage $+V_W$. Instead the threshold voltages of the transistors 5, 8 and 11 remains at the low initial threshold voltage $V_{th0}$. As shown in FIG. 4, this is approximately 4 volts. Thus the selected memory transistor 2 has a high state threshold $V_{th1}$ and the remaining memory transistors 5, 8 and 11 have a low state threshold $V_{th0}$corresponding respectively to the logical 1 and 0, respectively. When information stored in the circuit in FIG. 1 is to be read out, an address signal is applied to the appropriate X and Y terminals. In order to read information stored in the memory transistor 2 the address signal is applied to the terminals $X_1$ and $Y_1$ to make the FET's 1 and 17 conductive. At the same time a suitable voltage is also applied to the reading terminal R to make the FET's 15 and 16 conductive and thereby connect all of the drains of the memory transistors 2, 5, 8 and 11 together. However, since only the memory transistor 2 has been addressed, it is the only one that will be read. It is not necessary to apply the voltage to the terminal R in order to read the information stored in the memory transistors 2 and 5 since they are directly connected to the output terminals $R_{out1}$ and $R_{out2}$, but it is necessary to apply the voltage to the terminal R in order to read information stored in the memory transistors 8 and 11.

When the appropriate memory transistor has been addressed and, if necessary, connected to the appropriate output terminal by signal applied to the terminal R, the voltage $+V_R$ for readout is applied to the terminal R/W. The magnitude of this voltage is between $V_{th0}$ and $V_{th1}$ and may be, for example, +10 volts. The center column of FIGS. 2A–2F shows the pulse signals at each of the terminals of the circuit in FIG. 1 during readout.

Since the threshold voltage $V_{th1}$, which is shown in FIG. 4 as being 15 volts, is higher than the voltage $+V_R$, which has just been stated to be 10 volts, the memory transistor 2 will not become conductive in response to the readout voltage $+V_R$. Therefore, the drain electrode of the memory transistor 2 will remain at the level of the supply voltage $V_{DD}$ and the terminal $R_{out1}$ will also remain at this high level which corresponds to a logic 1. This was the value of the stored information in the memory transistor 2 before readout and, therefore, the readout has been nondestructive.

On the other hand, if the information stored in the memory transistor 2 had been a 0, the effect of addressing that transistor, applying the signal to the terminal R (although that is unnecessary in the case of the memory transistor 2), and applying the readout voltage $+V_R$ having a value of about 10 volts would be to make the memory transistor 2 become conductive. This is due to the fact that the readout voltage of +10 volts exceeds the low threshold voltage $V_{th0}$ of about 4 volts, which is shown in FIG. 4, and which corresponds to a storage of 0 in the memory transistor 2. The result of making the memory transistor 2 conductive is that current will be drawn through the FET 3 and the output terminal $R_{out1}$ will drop to a zero level. Since the readout voltage having a value of 10 volts is not high enough to change the threshold level of the memory transistor 2, the readout of a 0 will also be non-destructive.

In order to erase information stored on any of the memory transistors 2, 5, 8 or 11, signals are applied to the terminal R to make the FET's 15 and 16 conductive and to the terminal E to make the FET's 13 and 14 conductive. This causes the drain electrodes of each of the memory transistors 2, 5, 8 and 11 to be pulled down to the zero level. A negative erasing voltage $-V_E$ having a value of −40 volts, for example, is applied to the terminal R/W. As a result, any information stored in any of the memory transistors 2, 5, 8 and 11 will be erased and all of the transistors will be returned to the 0 level. The voltage on the terminals during erasing as shown in the right hand column in FIGS. 2A–2F.

In accordance with this invention it is thus clear that addressing signals applied to the terminals $X_1$, $X_2$, $Y_1$ and $Y_2$ need have only one polarity and a relatively low voltage. In addition, it is clear that the writing voltage $+V_W$, the reading voltage $+V_R$ and the erasing voltage $-V_E$ are all applied through the common terminal R/W and therefore the memory array and the decoder may be fabricated on a common chip or substrate. This makes it possible to increase the density of components, which is also referred to as increasing the integration density.

Figure 5:
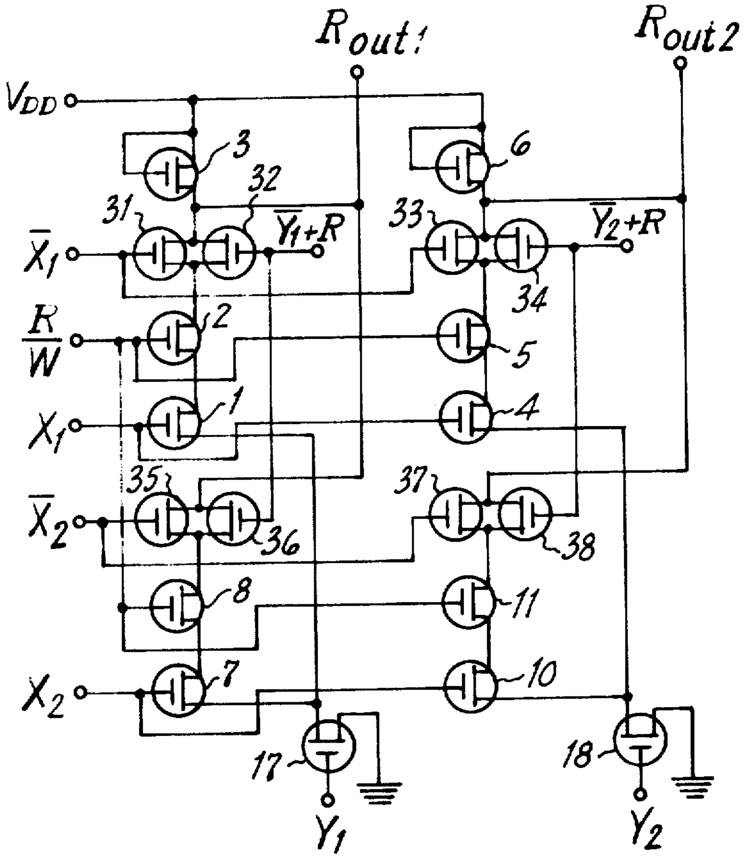
FIG. 5 is a schematic diagram of another embodiment of a memory circuit according to the present invention.
Figures 6A, 6B, 6C, 6D, 6E:
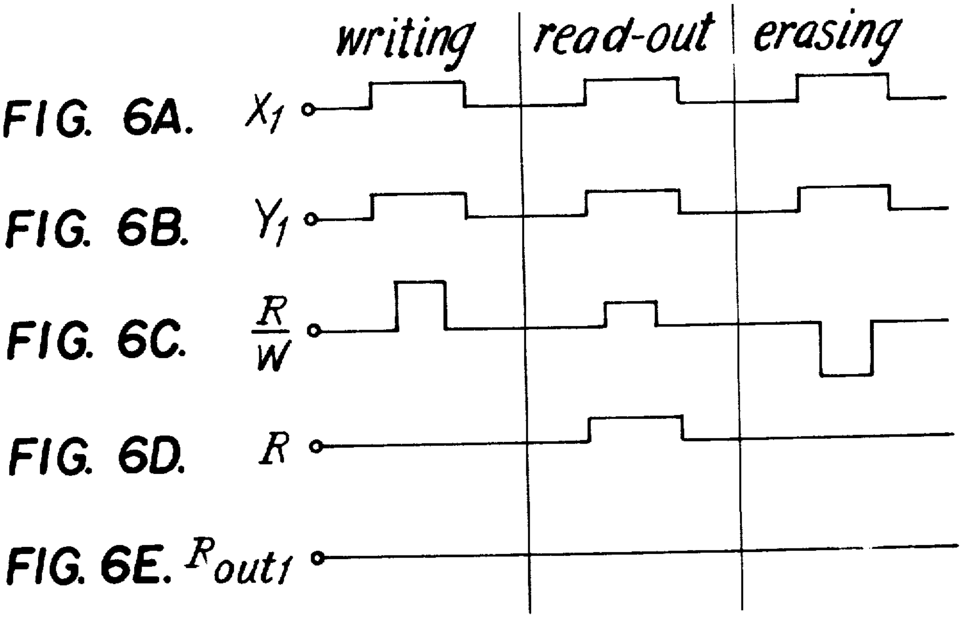
FIGS. 6A–6E represent voltage levels obtained in the operation of the circuit in FIG. 5 during writing, readout, and erasing.

FIG. 5 shows another embodiment of the invention but with many parts similar to parts in FIG. 1. These parts will be identified by the same reference numerals and their operation need not be explained in detail.

The circuit in FIG. 5 includes a pair of (MIS) FET's 31 and 32 having their source and drain electrodes directly connected to each other so that the output circuits of these FET's are in parallel and are connected between the drain electrode of the memory transistor 2 and the load FET 3. The gate electrode of the FET 31 is connected to an $\overline{X}_1$ terminal and the gate electrode of the FET 32 is connected to a $\overline{Y}_1$ +R terminal. The designations $\overline{X}_1$ and $\overline{Y}_1$ mean that signals of the opposite polarity to $X_1$ and $Y_1$ are applied to these terminals.

Similar (MIS) FET's 33 and 34 are connected in a corresponding manner between the drain of the memory transistor 5 and the load FET 6. The gate of the FET 33 is directly connected to the terminal $\overline{X}_1$ and the gate of the FET 34 is connected to a terminal $\overline{Y}_2$ + R.

Similar pairs of FET's 35, 36, 37, 38 are connected between the drain electrode of the memory transistors 8 and 11, respectively, and the load FET's 3 and 6. In this circuit only one load FET is provided for each column rather than a separate load FET for each one-bit cell as in the circuit in FIG. 1. The gate electrodes of the FET's 35 and 37 are both connected to a terminal $\overline{X}_2$ and the gate electrodes of the FET's 36 and 38 are connected, respectively, to the terminals $\overline{Y}_1$ + R and $\overline{Y}_2$ + R. The load FET's 3 and 6 are connected to the respective output terminals $R_{out1}$ and $R_{out2}$.

The signals $X_1$ and $Y_1$ to address the memory transistor 2 and the writing signal $+V_W$ applied to the terminal R/W are illustrated in FIGS. 6A–6E. As in the circuit in FIG. 1, when it is desired to read out information stored in one of the memory transistors, in this example the memory transistor 2, the same address signals are applied along with a readout signal $+V_R$ of a magnitude sufficient to determine whether a logical 0 or 1 is stored on that memory transistor. The appropriate voltages are shown in the center column 6A–6E. In order to erase a signal stored in the memory transistor 2, erasing signals are applied to address that transistor and an erasing signal $-V_E$ is applied to the terminal R/W.

Figure 7:
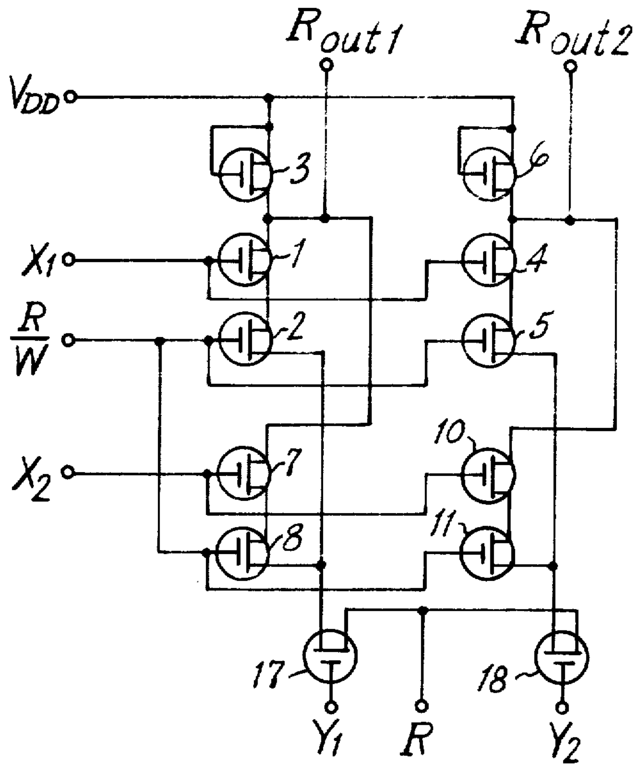
FIG. 7 is a schematic diagram of yet another embodiment of the invention.
Figures 8A, 8B, 8C, 8D, 8E:
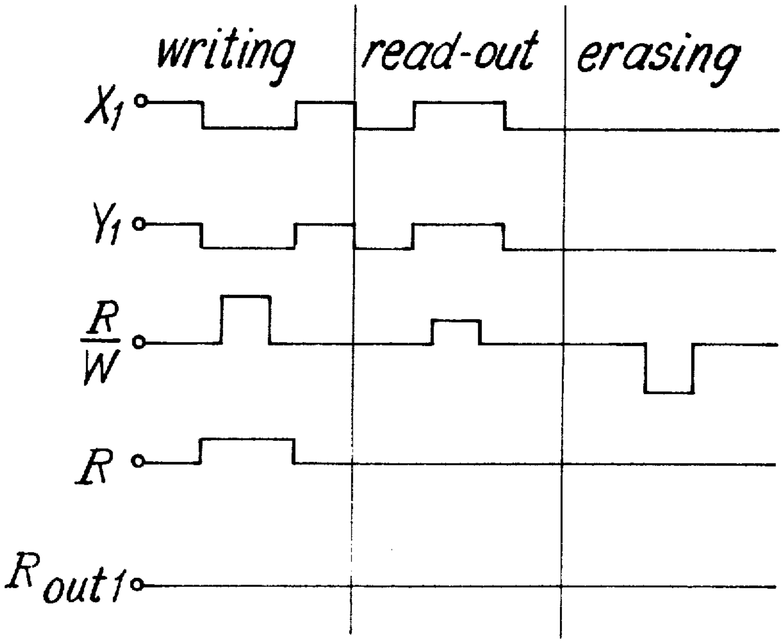
FIGS. 8A–8E show voltage levels present in the operation of the circuit in FIG. 7.

FIG. 7 shows an embodiment in which each one-bit cell consists of only two elements which is different from the embodiments in FIGS. 1 and 5. In FIG. 7 the FET's 1, 4, 7 and 10 that determine the X address of the matrix are connected, respectively, to the drains of the memory transistors 2, 5, 8 and 11 instead of to the sources thereof. In addition, the terminal R is connected to the sources of both of the FET's 17 and 18 through which the Y address is applied to the matrix.

In the operation of the circuit in FIG. 7 the voltage pulses illustrated in FIGS. 8A–8E are present at the indicated terminals.

In the description the memory transistors 2, 5, 8 and 11 were indicated as being of the MNOS or MAOS type FET, but other types of memory transistors can also be utilized. Furthermore, the FET's 2, 5, 8 and 11 are not limited to N-channel enhancement-type, but P-channel and depletion-type FET's can be used therefor. Instead of the (MIS) FET's 1 and 3, for example, other switching elements, such as bi-polar or normal transistors or even resistors, can also be used.

What is claimed is:

1. A memory circuit comprising:

A. a field-effect memory transistor having a gate input electrode and source and drain output electrodes, said memory transistor having a first threshold when subjected to a gate signal voltage less than a first value and having a second threshold when subjected to a gate signal voltage greater than a second value which is higher than said first value;

B. first and second field-effect addressing transistors, each having a gate electrode, a source electrode, and a drain electrode, said source and drain electrodes of said memory transistor and said source and drain electrodes of said first and second addressing transistors being connected in series with each other to permit current flow through said source and drain electrodes of said memory transistor only when both said addressing transistors are conductive;

C. means for applying addressing signals to the gate electrodes of said addressing transistors so as to render the latter conductive; and D. means for applying a gate signal voltage to the gate of said memory transistor when said addressing transistors are conductive, said gate signal voltage being selectively less than said first value to cause said memory transistor to have said first threshold corresponding to a first binary number, greater than said second value to cause said memory transistor to have said second threshold corresponding to a second binary number, and greater than said first value and less than said second value to read the threshold of said memory transistor non-destructively.

2. The memory circuit of claim 1 in which said memory field-effect transistor is a metal-aluminum oxide-silicon dioxide-semi-conductor.

3. The memory circuit of claim 1 in which said memory field-effect transistor is a metal-silicon nitride-silicon dioxide semiconductor.

4. A memory circuit comprising:

A. a matrix of first, second, third and fourth one-bit cells each including 1. a memory field-effect transistor having a gate input electrode and source and drain output electrodes, said transistor having a first threshold voltage when subjected to a gate signal voltage less than a first value and having a second threshold when subjected to a gate signal voltage greater than a second value which is higher than said first value, 2. a first-coordinate address metal-insulator-silicon field-effect transistor having a gate electrode and source and drain electrodes, said source and drain electrodes of said first-coordinate address transistor being connected in series with the source and drain electrodes of said memory transistor of the respective cell to form a series circuit, and 3. a load element connected to the drain electrode of the memory transistor of the respective cell;

B. a first first-coordinate address input terminal connected to the gate electrodes of said first-coordinate address transistors of said first and second one-bit cells;

C. a second first-coordinate address input terminal connected to the gate electrodes of said first-coordinate address transistors of said third and fourth one-bit cells;

D. a first second-coordinate address field-effect transistor having a gate electrode and further having source and drain electrodes connected in series with said series circuits of said first and third one-bit cells;

E. a second second-coordinate address field-effect transistor having a gate electrode and further having source and drain electrodes connected in series with said series circuits of said second and fourth one-bit cells;

F. a first second-coordinate address input terminal connected to said gate electrode of said first second-coordinate address transistor;

G. a second second-coordinate address input terminal connected to said gate electrode of said second second-coordinate address transistor;

H. a common input terminal connected to the gate electrodes of all of said memory field-effect transistors;

I. a first interconnecting field-effect transistor having a gate electrode and further having source and drain electrodes connected in series between said drain electrodes of said memory transistors of said first and third one-bit cells;

J. a second interconnecting field-effect transistor having a gate electrode and further having source and drain electrodes connected in series between the drain electrodes of said memory transistors of said second and fourth one-bit cells, said gate electrodes of said first and second interconnecting field-effect transistors being connected together to make said interconnecting transistors conductive and nonconductive in unison;

K. a first grounding field-effect transistor having a gate electrode and further having source and drain electrodes connected in series between a fixed potential and the drain electrode of said memory transistor of said first one-bit cell; and L. a second grounding field-effect transistor having a gate electrode and further having source and drain electrodes connected in series between said fixed potential and the drain electrode of said memory transistor of said second one-bit cell, said gate electrodes of said first and second grounding transistors being connected together to make said grounding transistors conductive and nonconductive in unison.

5. A memory circuit comprising:

A. A matrix of first, second, third and fourth one-bit cells, each comprising:

1. a memory field-effect transistor having a gate electrode and source and drain electrodes, and
2. a first-coordinate address metal-insulator-silicon field-effect transistor comprising a gate electrode and source and drain electrodes connected in series with the drain electrode of said memory transistor;

B. A first-coordinate address input terminal to the gate electrodes of said first-coordinate transistors of said first and second one-bit cells;

C. A second first-coordinate address input terminal to the gate electrodes of said first-coordinate transistors of said third and fourth one-bit cells;

D. A first second-coordinate address field-effect transistor having source and drain electrodes connected in series with said source electrodes of said memory transistors of said first and third one-bit cells;

E. A second second-coordinate address field-effect transistor having source and drain electrodes connected in series with said source electrodes of said memory transistors of said second and fourth one-bit cells;

F. A readout control terminal connected to said source electrodes of each of said second-coordinate address transistors;

G. A first second-coordinate address input terminal to the gate of said first second-coordinate transistor;

H. A second second-coordinate address input terminal to the gate of said second second-coordinate transistor;

I. A first load element connected in series with said source and drain electrodes of said first-coordinate address transistor of said first and third one-bit cells; and J. A second load element connected in series with said source and drain electrodes of said first-coordinate address transistor of said second and fourth one-bit cells.

6. A memory circuit comprising:

A. a matrix of first, second, third, and fourth one-bit cells, each comprising:

1. a memory field-effect transistor having a gate input electrode and source and drain output electrodes and having a first threshold when subjected to a gate signal voltage less than a first value and having a second threshold when subjected to a gate signal voltage greater than a second value which is higher than said first value, and
2. a first-coordinate address metal-insulator-silicon field-effect transistor comprising a gate electrode and source and drain electrodes, said source and drain electrodes of said first-coordinate address transistor being connected in series with the source and drain electrodes of said memory transistor of the respective cell to form a series circuit;

B. a first first-coordinate address input terminal connected to the gate electrodes of said first-coordinate address transistors of said first and second one-bit cells;

C. a second first-coordinate address input terminal connected to the gate electrodes of said first-coordinate address transistors of said third and fourth one-bit cells;

D. a first second-coordinate address field-effect transistor having a gate electrode and further having source and drain electrodes connected in series with said series circuits of said first and third one-bit cells;

E. a second second-coordinate address field-effect transistor having a gate electrode and further having source and drain electrodes connected in series with said series circuits of said second and fourth one-bit cells;

F. a first second-coordinate address input terminal connected to said gate electrode of said first second-coordinate address transistor;

G. a second second-coordinate address input terminal connected to said gate electrode of said second second-coordinate address transistor: and H. a common input terminal connected to the gate electrodes of all of said memory field-effect transistors for selectively receiving a gate signal voltage less than said first value, a gate signal voltage greater than said second value and a gate signal voltage which is between said first and second values.

7. The memory circuit of claim 6, in which said first-coordinate address transistor of each said one-bit cells has its said source and drain electrodes connected in series between the source electrode of the memory trainsistor of respective cell and the drain electrode of the respective second-coordinate address transistor connected thereto.

8. The memory circuit of claim 7 in which each of said one-bit cells comprises, in addition, a pair of field-effect transistors having source and drain electrodes connected together and connected in series with the respective memory transistor of that cell, and said circuit comprises, in addition:

A. A first field-effect load transistor connected in series with said pair of parallel-connected transistors of said first and third one-bit cells; and B. A second field-effect load transistor connected in series with the pair of parallel-connected transistors of said second and fourth one-bit cells.

* * * * *